Jan. 17, 1933.　　C. H. PHELPS　　1,894,495
CASTER MAINTAINING SHIM
Filed April 7, 1931
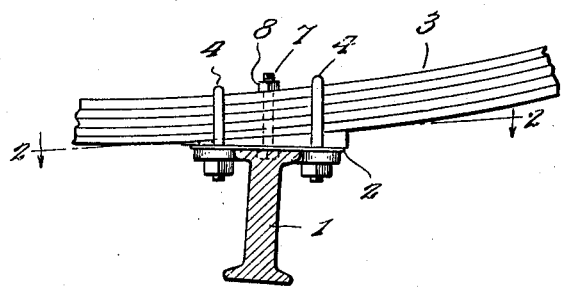
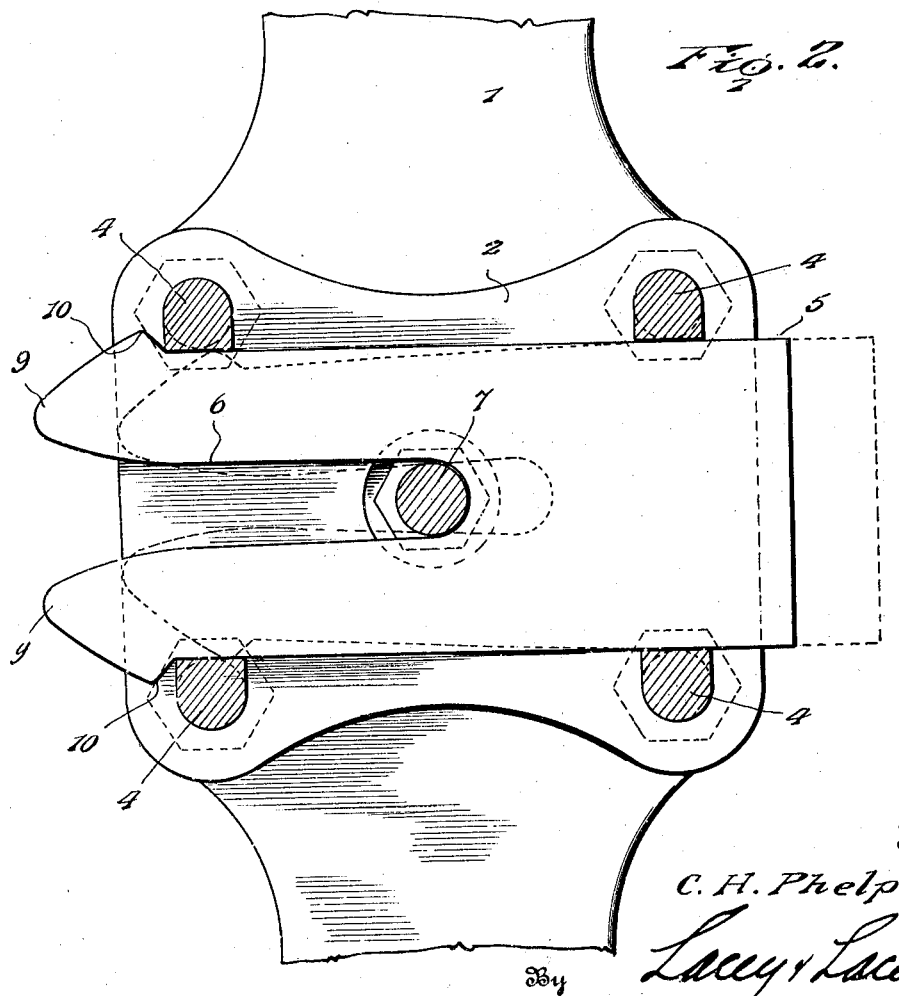
Inventor
C. H. Phelps.
By Lacey & Lacey,
Attorneys Patented Jan. 17, 1933

1,894,495

UNITED STATES PATENT OFFICE

CLYDE H. PHELPS, OF MOUNT VERNON, NEW YORK, ASSIGNOR TO RIESS MANUFACTURING COMPANY, OF KOKOMO, INDIANA, A CORPORATION OF INDIANA

CASTER-MAINTAINING SHIM

Application filed April 7, 1931. Serial No. 528,386.

This invention is a simple, inexpensive and effective device for maintaining caster in a vehicle axle. The front axles of motor vehicles are set in a caster or inclination transversely as it has been amply demonstrated by experience that such position facilitates steering and promotes steady riding qualities in the vehicle. It is of course necessary for the body supporting springs to be attached to the body at such points as will maintain a level position of the body and to resist the tendency of the springs to turn the axle out of the desired caster or inclination a shim is inserted between the spring and the top of the axle; and a particular object of the present invention is to provide a structure which will resist withdrawal or loss of the shim.

The invention is illustrated in the accompanying drawing and consists in certain novel features which will be hereinafter first fully described and then more particularly defined in the appended claims.

In the drawing

Fig. 1 is a view showing my improved shim applied with the axle in section;

Fig. 2 is an enlarged plan view with parts in section on the line 2—2 of Fig. 1.

The reference numeral 1 indicates a front axle constructed with a spring pad or seat of usual form, indicated at 2, and held to springs 3 by the usual clips 4.

In carrying out the present invention, a shim 5 is inserted between the springs and the top of the spring pad 2 and this shim is of tapered or wedge shape formation as shown in Fig. 1 so that when it is driven home it will separate the spring and the axle and impart an inclination to the axle as clearly shown in Fig. 1. The entering end of the shim is constructed with a longitudinal slot, shown at 6 in Fig. 2, whereby it may pass the center pin or bolt 7, the head of which is seated in a socket in the top of the axle as shown by the dotted lines in Fig. 1, the shank of the bolt passing up through the spring and being equipped with a nut 8 turned home against the spring to position the springs in place. The extremities of the side members of the shim are tapered, as shown at 9, into arrow-head form and have on their outer edges lugs or projections 10 which are adapted to ride on the inner edges of the shackles or clips 4 whereby they will be forced or squeezed inwardly, as will be understood by reference to the dotted lines of Fig. 2. It will be understood that the entering end of the shim is somewhat resilient so that it may be compressed to pass between the sides of the clip or shackle bolt and then spring outwardly whereby the lugs 10 will be projected outwardly beyond the inner surfaces of the bolts and resist withdrawal of the shim. It will be understood that some force must be applied to the shim to drive it home so that its entering ends will assume the position shown in Fig. 1, and when it has been driven home retrograde movement of the shim will be effectually prevented. Should the entering movement of the shim stop for any reason before the shim has been driven fully home or through accident or other cause the shim should work backward into the position shown by the dotted lines in Fig. 2, the sides or tines will be forced towards one another and the width of the slot 6 will be consequently decreased so that it will be less than the diameter of the center bolt or pin 7 and, consequently, the shim will be locked against further withdrawal by the engagement of the side walls of the slot with the center pin or bolt 3. Inasmuch as some force is required to move the shim between the springs and the axle the withdrawal of the shim and consequent loss of the same cannot occur and the caster imparted to the axle will be maintained.

Having thus described the invention, what I claim is:

1. A device for the purpose set forth comprising a wedge-shaped shim provided with an open-ended slot in its entering end, the side portions of the shim being somewhat resilient whereby the structure may clear the center bolt and enter between the clip bolts of a spring and axle assembly and effect frictional engagement with the clip bolts to prevent withdrawal.

2. A device for the purpose set forth comprising a wedge-shaped shim provided at the entering end with a medial open-ended slot and lateral projections on its outer side edges whereby to engage the bolts of a spring and axle assembly and prevent withdrawal of the shim.

3. In combination with the springs and axle of a vehicle, a wedge-shaped shim having resilient tapered arms at its entering end whereby the arms may be compressed to pass between the clip bolts of the spring and axle assembly and provided on their outer edges with projections to engage in front of the bolts and prevent withdrawal of the shim.

In testimony whereof I affix my signature.

CLYDE H. PHELPS. [L. S.]